United States Patent
Schulz (10) Patent No.: US 8,403,398 B2
(45) Date of Patent: Mar. 26, 2013

(54) MOTOR VEHICLE WITH A SLIDING DOOR AND AN ADJUSTABLE ARMREST

(75) Inventor: Harald Schulz, Nackenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 12/541,039

(22) Filed: Aug. 13, 2009

(65) Prior Publication Data

US 2010/0045067 A1    Feb. 25, 2010

(30) Foreign Application Priority Data

Aug. 25, 2008   (DE) .................. 10 2008 039 609

(51) Int. Cl.
B60J 5/06   (2006.01)

(52) U.S. Cl. .................. 296/146.1; 296/155; 296/153; 49/502

(58) Field of Classification Search .............. 296/1.09, 296/153, 155, 146.1; 297/411.21; 49/502
See application file for complete search history.

(56) References Cited

U.S. PATENT DOCUMENTS

| | | | | |
|---|---|---|---|---|
| 2,026,016 A * | 12/1935 | Blood | | 296/153 |
| 2,690,794 A * | 10/1954 | Ahern | | 296/153 |
| 2,922,674 A | 1/1960 | Hollerbach | | |
| 4,783,114 A * | 11/1988 | Welch | | 296/153 |
| 4,929,017 A * | 5/1990 | Lilienthal et al. | | 296/153 |
| 5,967,594 A * | 10/1999 | Ramanujam | | 296/153 |
| 6,145,919 A * | 11/2000 | Mysliwiec et al. | | 296/153 |
| 6,164,592 A * | 12/2000 | Stephan et al. | | 244/118.1 |
| 6,796,601 B2 | 9/2004 | Boernchen et al. | | |
| 6,905,163 B2 * | 6/2005 | Bornchen et al. | | 296/153 |
| 7,384,092 B2 * | 6/2008 | Hodges | | 296/153 |
| 7,758,102 B2 * | 7/2010 | Quigley et al. | | 296/153 |
| 2004/0100122 A1 * | 5/2004 | Bornchen et al. | | 296/153 |
| 2008/0073935 A1 | 3/2008 | Hodges | | |
| 2008/0164718 A1 | 7/2008 | Quigley et al. | | |

FOREIGN PATENT DOCUMENTS

| | | |
|---|---|---|
| DE | 3020038 A1 | 12/1981 |
| DE | 10029926 A1 | 1/2002 |
| DE | 20201105 U1 | 9/2002 |

(Continued)

OTHER PUBLICATIONS

German Patent Office, German Search Report for Application No. 102008039609.5, dated Jan. 27, 2009.

(Continued)

*Primary Examiner* — Glenn Dayoan
*Assistant Examiner* — Pinel Romain
(74) *Attorney, Agent, or Firm* — Ingrassia Fisher & Lorenz, P.C.

(57) ABSTRACT

A motor vehicle is provided with a sliding door, which has an inner side facing the vehicle interior, on which a protruding armrest is disposed. The sliding door can be displaced from a closed position in which the entry opening is closed by the sliding door, within the scope of an opening process via an intermediate position in which the sliding door is outwardly offset with respect to an adjoining vehicle wall, into an open position in which the inner side of the sliding door is disposed opposite to the outer side of the vehicle wall. Within the scope of the opening process the protruding armrest can be moved automatically from a usage position into a non-usage position in which the protruding armrest is set back with respect to the usage position in the direction of the inner side of the sliding door.

20 Claims, 4 Drawing Sheets

FOREIGN PATENT DOCUMENTS

| | | | |
|---|---|---|---|
| DE | 10244506 | A1 | 4/2004 |
| DE | 10259592 | A1 | 7/2004 |
| DE | 10307481 | A1 | 9/2004 |
| DE | 102007045491 | A1 | 4/2008 |
| DE | 102007022331 | A1 | 11/2008 |
| EP | 1666302 | A1 | 6/2006 |
| FR | 2813565 | A1 | 3/2002 |
| FR | 2876065 | A1 | 4/2006 |
| FR | 2888785 | A1 | 1/2007 |
| FR | 2897306 | A1 | 8/2007 |
| JP | 2005104173 | A | 4/2005 |
| WO | 0050257 | A1 | 8/2000 |

OTHER PUBLICATIONS

UK IPO, British Search Report for Application No. 0914486.6, dated Nov. 5, 2009.

UK IPO, British Examination Report for Application No. 0914486.6, dated Nov. 24, 2011.

UK IPO, British Examination Report for Application No. 0914486.6, dated Mar. 2, 2012.

* cited by examiner

MOTOR VEHICLE WITH A SLIDING DOOR AND AN ADJUSTABLE ARMREST

CROSS-REFERENCE TO RELATED APPLICATION

This application claims priority to German Patent Application No. 102008039609.5, filed Aug. 25, 2008, which is incorporated herein by reference in its entirety.

TECHNICAL FIELD

The present invention relates to a motor vehicle with a sliding door, which has an inner side facing the vehicle interior, on which a protruding armrest is disposed. The sliding door can be displaced from a closed position in which the entry opening of the motor vehicle is closed by the sliding door, within the scope of an opening process via an intermediate position in which the sliding door is outwardly offset with respect to an adjoining vehicle wall, into an open position in which the inner side of the sliding door is disposed opposite to the outer side of the vehicle wall.

BACKGROUND

Motor vehicles with sliding doors are known from the prior art. Usually relatively small protruding armrests are disposed on the inner side of the sliding door facing the vehicle interior, on which the vehicle occupant can rest his arm when the sliding door is located in the closed position in which the sliding door closes an entry and exit opening of the motor vehicle. Within the scope of an opening process, the sliding door can be displaced via an intermediate position in which the sliding door is outwardly offset with respect to an adjacent vehicle wall, into an open position in which the inner side of the sliding door is disposed opposite the outer side of the vehicle wall. Since the distance between the inner side of the sliding door on the one hand and the outer side of the adjacent vehicle wall on the other hand is relatively small in the open position of the sliding door, on the inner side of the sliding door the armrest must not protrude so far in the direction of the outer side of the adjoining vehicle wall in order to prevent a collision between the armrest on the one hand and the outer side of the adjoining vehicle wall on the other hand. Thus, from the prior art for motor vehicles sliding doors are only known having a particularly small armrest. This has the disadvantage that a vehicle occupant can only rest on the armrest to a certain extent.

It is therefore at least one object of the present invention to provide a motor vehicle with a sliding door having a protruding armrest disposed on the inner side facing the vehicle interior. The armrest is intended on the one hand to provide a secure support for the vehicle occupant in the closed position of the sliding door and on the other hand, is intended to enable a collision-free displacement of the sliding door into the open position of the sliding door. In addition, objects, desirable features, and characteristics will become apparent from the subsequent summary and detailed description, and the appended claims, taken in conjunction with the accompanying drawings and this background.

SUMMARY

The motor vehicle according to an embodiment of the invention has a sliding door having a protruding armrest disposed on the inner side facing the vehicle interior. The sliding door can be displaced from a closed position in which an entry opening of the motor vehicle is closed by the sliding door, within the scope of an opening process via an intermediate position in which the sliding door is outwardly offset with respect to an adjoining vehicle wall, into an open position in which the inner side of the sliding door is disposed opposite the outer side of the vehicle wall. According to an embodiment of the invention, within the scope of the opening process the armrest can be moved automatically from a usage position into a non-usage position in which the armrest is set back with respect to the usage position in the direction of the inner side of the sliding door. Any drive is feasible for producing the automatic movement of the armrest from the usage into the non-usage position, it being particularly preferred if the armrest is coupled to the movement of the sliding door or another component that is moved within the scope of the opening process.

Since the armrest is moved automatically within the scope of the opening process from the usage position into the non-usage position in which the armrest is set back with respect to the usage position in the direction of the inner side of the sliding door, a collision of the armrest with the outer side of the adjoining vehicle wall is prevented. Also, the sliding door must not be pushed so far outward into the intermediate position; rather only a small outward displacement path is required in order to achieve the necessary distance between the inner side of the sliding door and the outer side of the vehicle wall. The latter is required in order to be able to subsequently displace the sliding door from the intermediate position in a collision-free manner into the open position. Since the armrest is automatically moved into the non-usage position, the handling of the sliding door is further simplified especially as the vehicle occupant or the entering person is not forced to move the armrest manually into the non-usage position before the sliding door is displaced into the open position.

In order to further simplify the handling of the sliding door, in a preferred embodiment of the motor vehicle according to an embodiment of the invention, the armrest is further movable automatically from the non-usage position into the usage position within the scope of a closing process in which the sliding door is displaced from the open position via the intermediate position into the closed position. In this embodiment, after displacing the sliding door into the closed position, the vehicle occupant or the person who has climbed out no longer need take action to move the armrest back into its usage position. Rather, as a result of displacement of the sliding door into its closed position, the armrest automatically returns to the usage position in which the armrest can again be used for supporting the arm of a vehicle occupant without further measures.

In order to allow more flexible usage of the vehicle interior by the vehicle occupants, in a further preferred embodiment of the motor vehicle according to an embodiment of the invention, in the closed position of the sliding door the armrest is movable manually from the usage position into the non-usage position and conversely. In combination with the previously described embodiment this would mean, for example, that the armrest moved automatically into the usage position need not remain permanently in the usage position. On the contrary, after displacing the sliding door into the closed position, the vehicle occupant has the opportunity to choose between the usage and the non-usage position. Thus, in the non-usage position the armrest allows a greater freedom of movement for the vehicle occupants whereas in the usage position the armrest offers the possibility that the vehicle occupant can rest comfortably on the armrest. In this case, it is particularly preferred if the armrest can be locked in the selected usage or non-usage position.

In an advantageous embodiment of the motor vehicle according to an embodiment of the invention, the armrest cooperates with the sliding door in such a manner that within the scope of the opening process by displacing the sliding door from the closed position into the intermediate position or by displacing the sliding door from the intermediate position into the open position, the armrest is moved from the usage into the non-usage position. In the first-mentioned alternative the displacement movement of the sliding door from the closed position into the intermediate position is coupled with the movement of the armrest so that the armrest is moved from the usage into the non-usage position in an early stage of the opening process. This ensures freedom from collision during the subsequent displacement of the sliding door from the intermediate position into the open position in a particularly reliable manner. In the second alternative, the displacement movement of the sliding door from the intermediate position into the open position is coupled to the movement of the armrest so that the movement of the armrest into the non-usage position only takes place in a later stage of the opening process. This is advantageous insofar as the armrest can still be used when the sliding door is already located in the intermediate position, wherein a collision of the armrest with the adjoining vehicle wall is also reliably avoided in this case, especially as the armrest is moved from the usage into the non-usage position at the latest during the displacement of the sliding door from the intermediate position into the open position.

By analogy with the previously described embodiment, in an alternative or additional embodiment, the armrest cooperates with the sliding door in such a manner that within the scope of the closing process by displacing the sliding door from the open position into the intermediate position or by displacing the sliding door from the intermediate position into the closed position, the armrest is movable from the non-usage into the usage position. With regard to the advantages of the two said alternatives, reference is made to the previously described embodiment, which applies accordingly here.

In a particularly preferred embodiment of the motor vehicle according to the invention, a locking mechanism is provided for unlocking and locking the sliding door located in the closed position within the scope of the opening or closing process, wherein the armrest cooperates with the locking mechanism in such a manner that during unlocking of the sliding door, the armrest is automatically movable from the usage position into the non-usage position and/or during locking of the sliding door, the armrest is automatically movable from the non-usage position into the usage position. In this embodiment, the opening process of the sliding door consequently further comprises the unlocking of the sliding door in the closed position, while the closing process further comprises the locking of the sliding door in the closed position. Thus, the locking of the sliding door in the closed position constitutes the end of the closing process while the unlocking constitutes the beginning of the opening process. If the opening process of the sliding door is initiated by the unlocking of said door, there remains sufficient time within which the armrest can move from the usage position into the non-usage position. This movement from the usage into the non-usage position must therefore not take place abruptly or particularly rapidly so that the risk of injury for the vehicle occupants is reduced. On the other hand, the closing process is terminated by the locking of the sliding door in the closed position so that the armrest is only then moved from the non-usage position into the usage position so that a collision of the armrest in the open position or the intermediate position of the sliding door with the outer side of the adjoining vehicle wall is completely eliminated.

In a further advantageous embodiment of the motor vehicle according to the invention, the locking mechanism comprises a door inner handle or/and a door outer handle for unlocking and locking the sliding door in the closed position. The vehicle occupant or the person climbing in or out must therefore merely manually actuate the door inner handle or the door outer handle in order to automatically move the arm rest from the usage position into the non-usage position and conversely.

In order that the sliding door need not be pushed so far outward into the intermediate position before a collision-free displacement of the sliding door from the intermediate position into the open position is possible, in a further advantageous embodiment of the motor vehicle according to the invention, in the non-usage position the armrest at least partially, preferably completely lies in a receptacle on the inner side of the sliding door. In this case, in the non-usage position the armrest preferably lies in the receptacle in such a manner that the armrest is disposed flush with the inner side of the sliding door or recedes behind the inner side of the sliding door.

In order to further simplify the handling of the sliding door, in a further preferred embodiment of the motor vehicle according to the invention, a spring device is provided for pretensioning the armrest in the non-usage position or the usage position. In this case, it is particularly preferable if the armrest is pretensioned in the non-usage position, especially as the armrest can then particularly easily be moved automatically without major effort into the non-usage position when the sliding door is opened.

In a further advantageous embodiment of the motor vehicle according to the invention, a locking device is provided for locking the armrest in the usage position or the non-usage position, wherein a manually actuatable operating part is preferably further provided for releasing the locking. In this embodiment it is preferable if the armrest can be locked with the aid of the locking device against the pretensioning force of the spring device in the usage position. Thus, the locking of the armrest in the usage position could be released particularly simply by means of the manually actuatable operating part, which can, for example, comprise a button, whereby the armrest is then moved independently from the usage position into the non-usage position as a result of the pretensioning force of the spring device. The armrest is therefore particularly simple and effortless to handle.

In order to prevent the armrest impacting too severely against another part of the sliding door in the non-usage position or the usage position, or to prevent any risk of injury for the vehicle occupant ensuing from the automatic movement of the armrest, in a particularly advantageous embodiment of the motor vehicle according to the invention, a damping device is provided for damping the movement of the armrest into the non-usage position or the usage position. The damping of the movement of the armrest, on the one hand, prevents too-severe impact of the armrest against the sliding door while on the other hand, there is no risk of injury to the vehicle occupant since he has sufficient time to remove his arm from the movement area of the armrest. In this embodiment, it is preferred if the movement of the armrest is damped into that position in which the armrest is pretensioned with the aid of the aforementioned spring device. In order to further simplify the mounting of the armrest itself as well as its attachment to the sliding door, the damping device and the spring device particularly preferably form a spring-damper unit, which is therefore connected as a module to the armrest or the sliding door.

In order to provide an armrest which is particularly easily movable, in a further advantageous embodiment of the motor vehicle according to the invention, the armrest can be pivoted about a pivot axis from the usage position into the non-usage position and conversely. In this case, a pivot axis is preferably only provided to keep the structure and the handling of the armrest particularly simple. In addition, it has proved to be particularly advantageous if the spring device is preferably configured as a helical spring wound about the pivot axis, especially as a spring device disposed and configured in this manner can be attached in a particularly space-saving manner to the sliding door or the armrest.

In order to reduce the risk of injury to the vehicle occupants in the event of a crash of the motor vehicle, especially a side impact, in a further advantageous embodiment of the invention, the armrest further cooperates with a safety device of the motor vehicle in such a manner that in the event of a crash, preferably in the event of a side impact, the armrest is automatically movable from the usage position into the non-usage position. Such a safety device can, for example, comprise a crash sensor or an airbag device, wherein the latter transmits a corresponding signal to the drive or the locking mechanism of the armrest when the airbag is triggered. In this embodiment, in particular safety devices already provided should be used. Since the arm rest is automatically moved from the usage into the non-usage position in the event of a motor vehicle crash, the vehicle occupant can no longer hit against the armrest, thus reducing the risk of injury. In this embodiment it is particularly advantageous to switch off the damping device, if one is provided, in the event of a crash so that the arm rest can move into the non-usage position particularly rapidly.

In order to be able to use the vehicle interior more flexibly, in a further particularly advantageous embodiment of the motor vehicle according to the invention, the armrest comprises at least one first and one second armrest portion which can be moved relative to one another. The vehicle occupant therefore has the possibility of adapting the armrest to his body size or to his sitting position inside the motor vehicle. In principle, one of the two armrest parts could also be provided independently of the other armrest part on the sliding door and/or be configured to be fixed. In the last-mentioned case, the fixed armrest portion should then protrude less severely into the vehicle interior. The two armrest portions are preferably disposed with respect to one another in such a manner that the armrest is enlarged in the longitudinal and/or transverse direction. This is particularly advantageous when the vehicle seat assigned to the armrest inside the vehicle interior can itself be displaced in the longitudinal and/or transverse direction since a comfortable position of the armrest in relation to the vehicle seat and therefore to the vehicle occupant is therefore possible. The enlargement of the armrest is particularly preferably accompanied by an enlargement of the upward-pointing armrest surface so that the vehicle occupant has a larger surface on which he can rest his arm. The relative movement of the two armrest portions relative to one another can take place in any manner, it being particularly preferred if the two armrest portions can be moved in a telescopic manner with respect to one another.

In order to still allow a secure movement of the armrest from the usage into the non-usage position, in a further particularly preferred embodiment of the motor vehicle according to the invention, the receptacle in the inner side of the sliding door is configured in such a manner that even the enlarged armrest can be accommodated in the receptacle when the armrest is moved from the usage position into the non-usage position. The vehicle occupant is consequently not forced to reverse any enlargement of the armrest in order to allow a secure and collision-free displacement of the sliding door into the open position, with the result that the handling of the sliding door is substantially more comfortable.

According to a further advantageous embodiment of the motor vehicle according to the invention, the first armrest portion is pivotable about the pivot axis, wherein the second armrest portion is disposed on an end of the first armrest portion facing away from the pivot axis. In this embodiment it is ensured in a particularly simple manner that the second armrest position in the usage position of the armrest can be moved relative to the first armrest position without the second armrest portion colliding with a component of the sliding door. In addition, the second armrest portion is disposed closer to the vehicle occupant so that this can be grasped more simply and moved into the desired position.

In order to allow a particularly secure support of the vehicle occupant's arm on the armrest, in a further preferred embodiment of the motor vehicle according to the invention in the usage position, the armrest has an upwardly pointing armrest surface, in which a recess is provided. The recess is preferably configured continuously in the longitudinal direction so that the arm of the vehicle occupant can always be accommodated comfortably in the recess of the armrest surface independently of the positioning of the vehicle occupant in the longitudinal direction. Thus, the arm resting on the armrest surface can project forward or backward over the armrest particularly unhindered in the longitudinal direction without restricting the seating comfort. In this case, it is particularly preferred if the recess is provided both in the first and in the second armrest portion which jointly form the upwardly pointing armrest surface.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
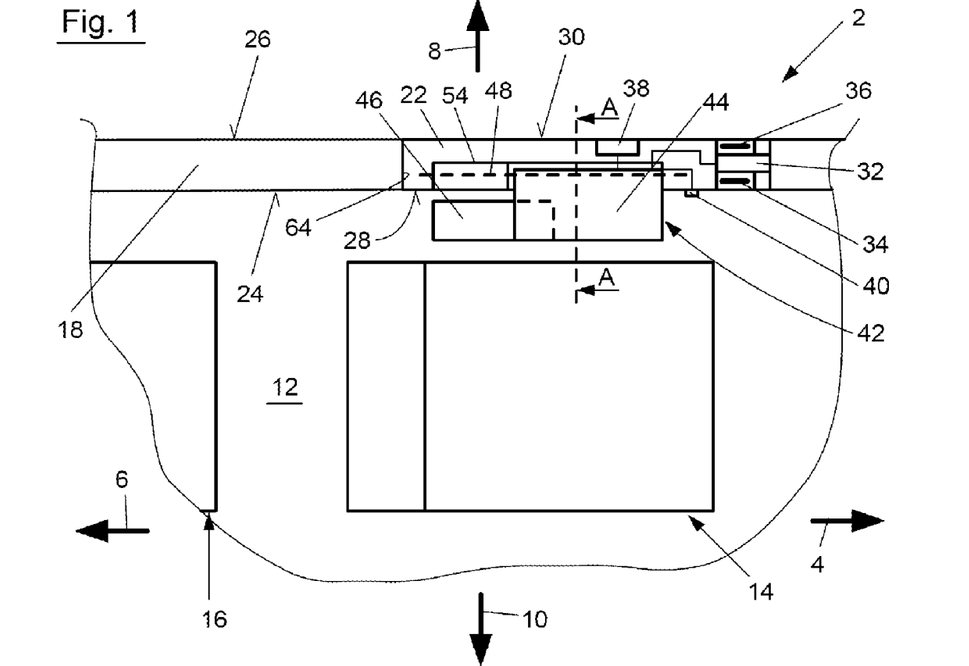
FIG. 1 shows a partial plan view of an embodiment of the motor vehicle according to the invention with the sliding door in the closed position and the armrest in the usage position.

FIG. 1 shows an embodiment of the motor vehicle 2 according to the invention. The motor vehicle 2 has two oppositely directed longitudinal directions 4, 6, wherein the longitudinal direction 4 corresponds to the forward direction and the longitudinal direction 6 corresponds to the reverse direction of the motor vehicle 2. In FIG. 1 the two oppositely directed transverse directions 8, 10 of the motor vehicle 2 are further indicated by means of arrows, wherein FIG. 1 shows a region of the motor vehicle 2 located in the transverse direction 8.

Figure 5:
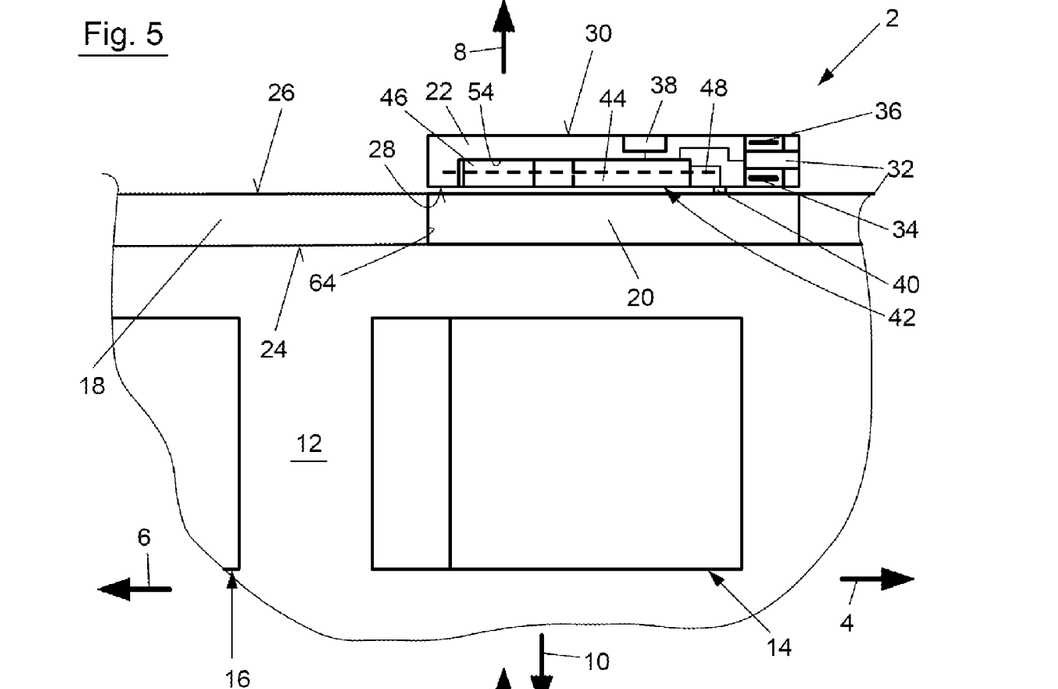
FIG. 5 shows the motor vehicle from FIG. 3 with the sliding door in the intermediate position and the armrest in the non-usage position.
Figure 6:
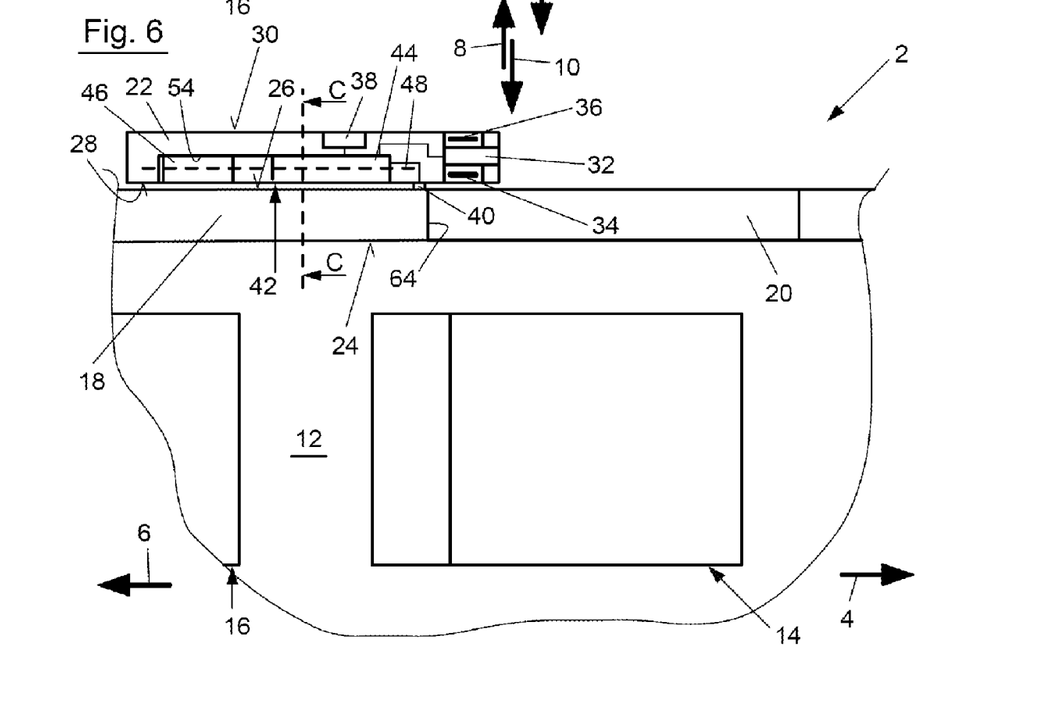
FIG. 6 shows the motor vehicle from FIG. 5 with the sliding door in the open position and the armrest in the non-usage position.
Figure 7:
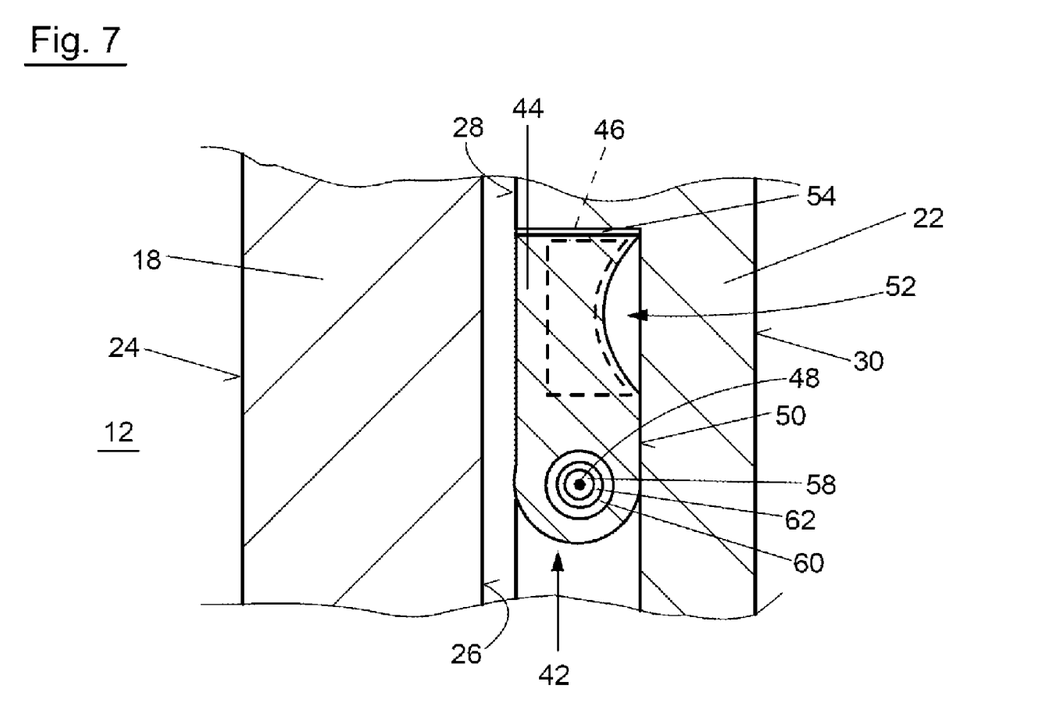
FIG. 7 shows a cross-sectional view along the line of intersection C-C from FIG. 6.

The motor vehicle 2 has a vehicle interior 12 in which a plurality of vehicle seats 14, 16 are disposed. The vehicle seats 14, 16 are disposed in such a manner inside the vehicle interior 12 that these can be displaced in the longitudinal direction 4,6 and can be locked in the respective positions. The vehicle interior 12 is delimited on its side pointing in transverse direction 8 inter alia by a vehicle wall 18. Provided inside the vehicle wall 18 is an entry opening 20 which can also be designated as exit opening and is disposed in transverse direction 8 adjacent to the vehicle seat 14. The entry opening 20 allocated to the vehicle seat 14 which can be identified in particular in FIG. 5 and FIG. 6, is closed in FIG. 1 by a sliding door 22 of the motor vehicle 2. Thus, the sliding door 22 is located in a closed position in FIG. 1.

The vehicle wall 18 has an inner side 24 facing the vehicle interior 12 in transverse direction 10 and an outer side 26, pointing in transverse direction 8, and facing away from the vehicle interior 12. In corresponding manner, the sliding door 22 also has an inner side 28 facing the vehicle interior 12 in transverse direction 10 and an outer side 30 facing away from the vehicle interior 12, pointing in transverse direction 8. At its end located in longitudinal direction 4, the sliding door 22 further has a locking mechanism 32 by which means the sliding door 22 located in the closed position can be locked and unlocked. In this case, the locking mechanism 32 comprises a door inner handle 34 on the inner side 28 of the sliding door 22 and a door outer handle 36 on the outer side 30 of the sliding door 22, wherein the two door handles 34, 36 are configured as pivoted levers which, on actuation of the same, effect an unlocking or locking of the sliding door 22 in the closed position of FIG. 1.

Further provided on the sliding door 22 is a safety device 38 in the form of a crash sensor by which means a crash of the motor vehicle 2, in particular a side impact of said vehicle in transverse direction 8, can be determined. This safety device 38 is disposed in the area of the outer side 30 of the sliding door 22. In contrast, a manually actuatable operating part 40 is provided on the inner side 28 of the sliding door 22, which can be reached particularly easily by a vehicle occupant on the vehicle seat 14 and whose function will be discussed in detail subsequently.

On its inner side 28, the sliding door 22 furthermore has an armrest 42 protruding in transverse direction 10 into the vehicle interior 12, provided that this is in the usage position shown in FIG. 1. In the present embodiment, the armrest 42 substantially includes a first armrest portion 44 and a second armrest portion 46. The first armrest portion 44 is disposed on the sliding door 22 so that it is pivotable about a pivot axis 48, wherein the pivot axis 48 extends in longitudinal direction 4 or 6 of the sliding door 22 or the motor vehicle 2. Thus, the armrest 42 can be pivoted about the pivot axis 48 from the usage position shown inn FIG. 1 into the non-usage position shown in FIG. 3 and conversely, as will be explained in detail subsequently.

The second armrest portion 46 can be extended backward in a telescopic manner relative to the first armrest portion 44 in longitudinal direction 6 so that the size of the armrest 42 can be varied by displacing the second armrest portion 46 in longitudinal direction 4 or 6. This is particularly advantageous when the vehicle seat 14 is displaced far backward in longitudinal direction 6. The enlargement of the armrest 42 is accompanied by an enlargement of the armrest surface 50, which points upward in the usage position of the armrest 42, the surface being formed jointly by the upwardly pointing surfaces of the first and second armrest portion 44, 46.

Figure 2:
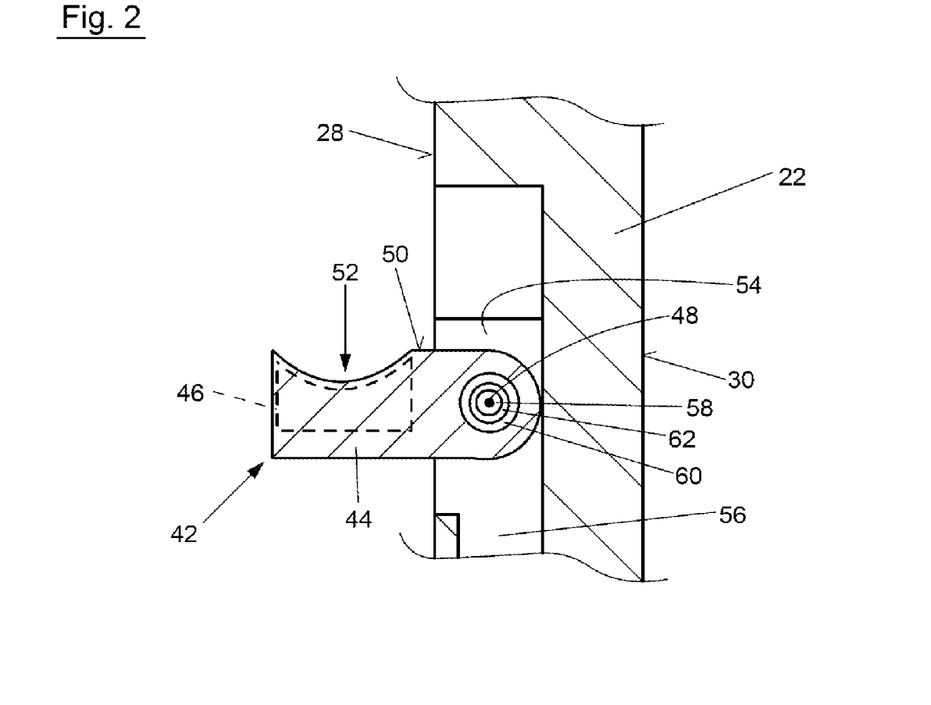
FIG. 2 shows a cross-sectional view along the line of intersection A-A from FIG. 1.

As is further apparent from FIG. 1 and FIG. 2, the second armrest portion 46 is disposed on an end of the first armrest portion 44 facing away from the pivot axis 48 so that a collision of the second armrest portion 46 during its relative displacement with respect to the first armrest position 44 with other components of the sliding door 22 is eliminated. In the armrest surface 50 which points upward in the usage position of the armrest 42, there is further provided a continuous recess 52 in longitudinal direction 4, 6, the recess 52 extending both over the first armrest portion 44 and over the second armrest portion 46. In this way, the continuous nature of the recess 52 in longitudinal direction 4, 6 is maintained even when the second armrest portion 46 is extended from the first armrest portion 44.

As is apparent from FIG. 2 in particular, in the usage position of the armrest 42, the end of the first armrest portion 44 pointing in transverse direction 8 extends into a recess or receptacle 54 in the inner side 28 of the sliding door 22. The receptacle 54 extends far downward in the height direction in such a manner that a storage compartment 56 is formed below the pivot axis 48 of the armrest 42, which has an upwardly pointing opening through which useful items can be inserted into the storage compartment 56. The pivot axis 48 extends inside the receptacle 54, the receptacle 54 serving to receive the armrest 42 in its non-usage position as will be explained in detail subsequently In order to pretension the armrest 42 in the non-usage position, a spring device 58 shown merely schematically in FIG. 2 is provided. In the present example, the spring device 58 is formed by a helical spring wound around the pivot axis 48 so that the spring device 58 can be disposed in a particularly space-saving manner inside the receptacle 54. In order to be able to lock the armrest 42 in the usage position shown in FIG. 2 against the pretensioning force of the spring device 58, a locking device 60 likewise only shown schematically is provided. Both the safety device 38 and also the button-shaped operating part 40 are operatively connected to the locking device 60 in such a manner that the locking of the armrest 42 in the usage position is released and the armrest 42 is moved into the non-usage position as a result of the pretensioning force of the spring device 58 if a side impact of the motor vehicle 2 occurs or the operating part 40 is actuated manually by the vehicle occupants. A damping device 62 shown schematically is further provided for damping the movement of the armrest 42 from the usage position into the non-usage position, wherein the damping device 62 together with the spring device 58 forms a spring-damper element which can be mounted as a joint module.

The mode of operation and further features of the motor vehicle 2 will be explained hereinafter with reference to FIG. 1 to FIG. 7. In FIG. 1 and FIG. 2, the sliding door 22 is located in the closed position in which the entry opening 20 is closed by the sliding door 22. In the closed position the outer sides 30 of the sliding door 22 ends flush with the outer side 26 of the adjoining vehicle wall 18. Accordingly, the inner side 28 of the sliding door 22 ends flush with the inner side 24 of the adjoining vehicle wall 18.

Figure 3:
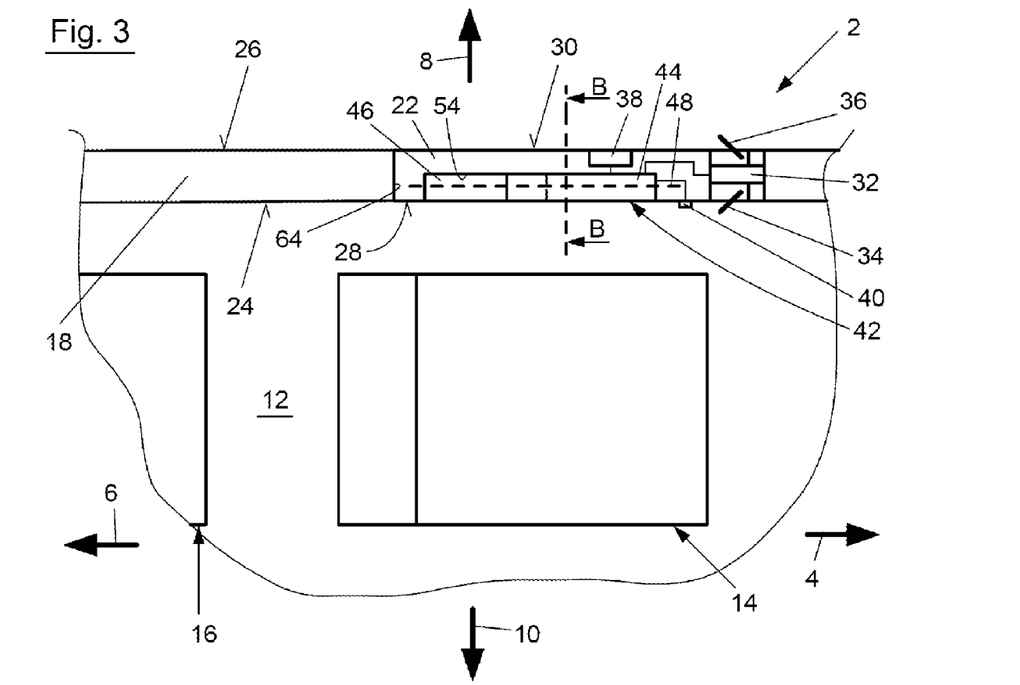
FIG. 3 shows the motor vehicle from FIG. 1 with the sliding door in the closed position and the armrest in the non-usage position.

If a vehicle occupant on the vehicle seat 14 wishes to exit or a person from outside the motor vehicle 2 wishes to enter, the door inner handle 34 or the door outer handle 36 must first be actuated as can be seen in FIG. 3. The locking mechanism 32 assigned to the two door handles 34, 36 thereby brings about an unlocking of the sliding door 22 located in the closed position. At the same time, the locking mechanism 32 cooperates with the locking device 60 of the armrest 42 in such a manner that the locking of the armrest 42 in the usage position is released. If the locking of the armrest 42 in the usage position is cancelled, the pretensioning force of the spring device 58 brings about a pivoting of the armrest 42 about the pivot axis 48 into the non-usage position shown in FIG. 3 and FIG. 4. This means that during unlocking of the sliding door 22 the armrest 42 is moved automatically from the usage into the non-usage position.

Figure 4:
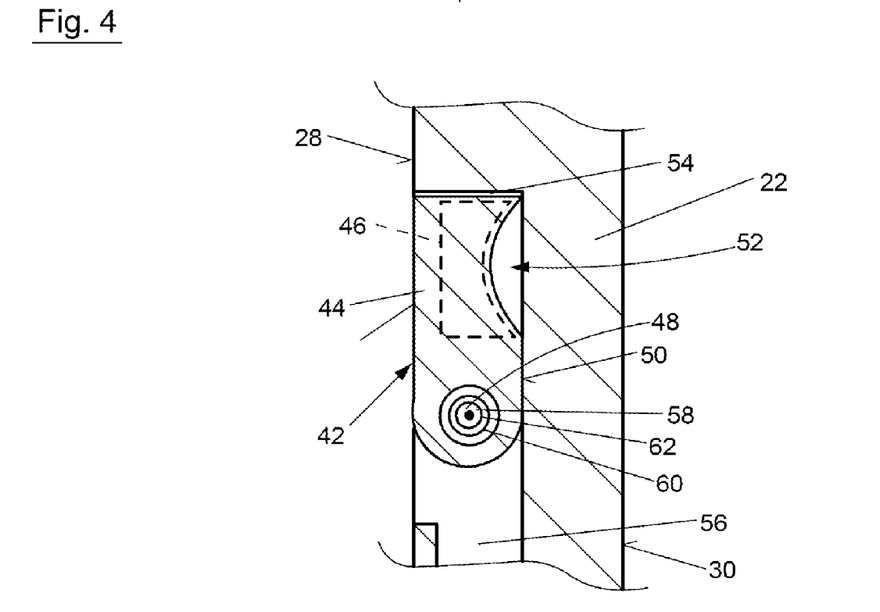
FIG. 4 shows a cross-sectional view along the line of intersection B-B from FIG. 3.

As is particularly apparent from FIG. 4, in the non-usage position the armrest 42 lies completely in the receptacle 54 on the inner side 28 of the sliding door 22 so that the armrest 42 is disposed flush with the inner side 28 of the sliding door 22. Alternatively, however, the armrest 42 can also lie in the receptacle 54 in such a manner that this recedes in transverse direction 8 behind the inner side 28 of the sliding door 22. As is particularly apparent from FIG. 3, the receptacle 54 is configured in such a manner that even the enlarged armrest 42 lies completely in the receptacle 54 without any collision occurring between the extended second armrest portion 46 and the inner side 28 of the sliding door 22. In the non-usage position of the armrest 42, the storage compartment 56 is better accessible than was the case in the usage position of the armrest 42, as follows from a comparison of FIG. 2 and FIG. 4.

Within the scope of the further opening process, the sliding door 22 can now initially be displaced outward in transverse direction 8 into an intermediate position shown in FIG. 5. In the intermediate position the sliding door 22 is offset outward with respect to the adjacent vehicle wall 18 in transverse direction 8. In the intermediate position of FIG. 5, the inner side 28 of the sliding door 22 is located further outward in transverse direction 8 than the outer side 26 of the adjoining vehicle wall 18 so that the sliding door 22 can then be displaced rearward in longitudinal direction 6 into an open position shown in FIG. 6.

In the open position of the sliding door 22, the entry opening 20 is exposed and the inner side 28 of the sliding door 22 is disposed opposite the outer side 26 of the vehicle wall 18. Since the armrest 42 lies in the receptacle 54 without the armrest 42 protruding beyond the inner side 28 of the sliding door 22 in transverse direction 10, during the displacement of the sliding door 22 in longitudinal direction 6, no collision occurs with the edge 64 of the vehicle wall 18 facing the entry opening 20 nor any friction between the armrest 42 on the one hand and the outer side 26 of the vehicle wall 18 on the other hand, as can be seen in particular from FIG. 7.

To sum up, it can be said that within the scope of the opening process, the armrest 42 was moved automatically from a usage position (FIG. 1 and FIG. 2) into a non-usage position (FIG. 3 to FIG. 7) in which the armrest 42 is set back with respect to the usage position in the direction of the inner side 24 of the sliding door 22 in transverse direction 8.

During the closing process in which the sliding door 22 is displaced from the open position in FIG. 6 via the intermediate position 5 back into the closed position in FIG. 1, the armrest 42 responds in a similar manner. Thus, the locking mechanism 32 cooperates with the armrest 42 in such a manner that during locking of the sliding door 22, the armrest 42 is pivoted automatically from the non-usage position (FIG. 3) about the pivot axis 48 into the usage position (FIG. 1). Regardless of whether the armrest 42 returns automatically from the non-usage position into the usage position during the closing process, in the closed position of the sliding door 22 the armrest 42 should also be able to be moved manually from the usage position into the non-usage position and conversely to allow a particularly flexible usage of the vehicle interior 12 by the vehicle occupants. In this case, the locking device 60 should be configured in such a manner that locking in the usage position and locking in the non-usage position is possible.

Whereas in the previously described embodiment the armrest 42 is moved automatically from the usage into the non-usage position at the beginning of the opening process by actuating the locking mechanism 32, in two alternative embodiments of the motor vehicle 2 according to the invention this movement of the armrest 42 commences at a later time. In a first alternative, the armrest 42 could cooperate with the sliding door 22 in such a manner that within the scope of the opening process the armrest 42 is only moved by displacement of the sliding door 22 from the closed position into the intermediate position. In a second alternative, the movement of the armrest 42 would only commence when the displacement of the sliding door 22 takes place from the intermediate position into the open position. The latter is to be preferred if the armrest 42 is still required for supporting the arm of the vehicle occupant in the intermediate position of the sliding door 22. Technically, the two said alternatives could be implemented by the respective displacement movement of the sliding door 22 in transverse direction 8 or in longitudinal direction 6 being coupled to the movement of the armrest 42 from the usage position into the non-usage position.

The two aforesaid alternatives are likewise obtained for the closing process of the sliding door 22. Thus, the pivoting movement of the armrest 42 from the non-usage position into the usage position must not take place only when locking the sliding door 22 in the closed position although this is preferably for safety reasons and for reasons of handling. In the first alternative the armrest could thus cooperate with the sliding door 22 in such a manner that the armrest 42 is moved from the non-usage position into the usage position by displacement of the sliding door 22 from the open position into the intermediate position. In the second alternative the armrest 42 could cooperate with the sliding door 22 in such a manner that the armrest 42 is moved from the non-usage position into the usage position within the scope of the closing process by displacement of the sliding door 22 from the intermediate position into the closed position.

Although the alternative solutions to the embodiment described initially are possible, the coupling of the locking mechanism 32 with the armrest 42 is to be preferred since a collision between armrest 42 and vehicle wall 18 can be particularly reliably eliminated in this way. In addition, it is ensured that the armrest 42 is only available when secure supporting of the vehicle occupant on the armrest 42 is possible. This would not be the case, for example, when the sliding door 22 is located in the intermediate position and could therefore be displaced.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
a sliding door having an inner side facing an interior of the motor vehicle;
a locking mechanism adapted for unlocking and locking the sliding door located in the closed position within the scope of an opening process or a closing process; and
a protruding armrest disposed on the inner side,
wherein the sliding door can be displaced from a closed position in which an entry opening of the motor vehicle is closed by the sliding door, within a scope of the opening process via an intermediate position in which the sliding door is outwardly offset with respect to an adjoining vehicle wall, into an open position in which the inner side of the sliding door is disposed opposite to an outer side of the adjoining vehicle wall,
wherein, within the scope of the opening process, the protruding armrest is movable automatically from a usage position into a non-usage position in which the protruding armrest is set back with respect to the usage position in a direction of the inner side of the sliding door, and
wherein, within the scope of the closing process in which the sliding door is displaced from the open position via the intermediate position into the closed position, the protruding armrest is further movable automatically from the non-usage position into the usage position
wherein the protruding armrest is adapted to cooperate with the locking mechanism in such a manner that:
during unlocking of the sliding door, the protruding armrest is automatically movable from the usage position into the non-usage position; and
during locking of the sliding door, the protruding armrest is automatically movable from the non-usage position into the usage position.

2. The motor vehicle according to claim 1, wherein in the closed position the protruding armrest is movable manually from the usage position into the non-usage position and lockable in at least one of the usage position and the non-usage position.

3. The motor vehicle according to claim 1, wherein the protruding armrest cooperates with the sliding door in such a manner that within the scope of the opening process by displacing the sliding door from the closed position into the intermediate position, the protruding armrest is automatically movable from the usage position into the non-usage position.

4. The motor vehicle according to claim 1, wherein the locking mechanism comprises a door handle for unlocking and locking the sliding door in the closed position.

5. The motor vehicle according to claim 1, wherein in the non-usage position, the protruding armrest is adapted to at least partially lie in a receptacle on the inner side of the sliding door,
wherein in the non-usage position the protruding armrest is adapted to lie in the receptacle in such a manner that the protruding armrest is disposed flush with the inner side of the sliding door.

6. The motor vehicle according to claim 1, further comprising a spring device adapted for pretensioning the protruding armrest in the non-usage position or the usage position.

7. The motor vehicle according to claim 6, further comprising a locking device adapted for locking the protruding armrest in the usage position or the non-usage position; and
a manually actuatable operating part adapted for releasing the locking 8. The motor vehicle according to claim 6, further comprising a damping device adapted for damping a movement of the protruding armrest into the non-usage position or the usage position,
wherein the damping device is adapted to form a spring-damper unit with the spring device.

9. The motor vehicle according to claim 8, wherein the protruding armrest is pivotable about a pivot axis from the usage position into the non-usage position,
wherein the spring device is preferably a helical spring wound about the pivot axis.

10. The motor vehicle according to claim 1, wherein the protruding armrest is adapted to further cooperate with a safety device of the motor vehicle in such a manner that in a crash, the protruding armrest is automatically movable from the usage position into the non-usage position.

11. The motor vehicle according to claim 1, wherein the protruding armrest comprises at least a first armrest portion and a second armrest portion that are movable relative to one another while enlarging the protruding armrest,
wherein a receptacle is preferably configured in such a manner that even an enlarged protruding armrest can be accommodated in the receptacle.

12. The motor vehicle according to claim 11, wherein the first armrest portion is pivotable about a pivot axis,
wherein the second armrest portion is disposed on an end of the first armrest portion facing away from the pivot axis.

13. The motor vehicle according to claim 1, wherein in the usage position, the protruding armrest has an upwardly pointing armrest surface having a recess that is preferably configured at least substantially continuously in a longitudinal direction,
wherein the recess is particularly preferably provided both in a first armrest portion and in a second armrest portion.

14. The motor vehicle according to claim 1, wherein the protruding armrest is automatically moveable from the usage position into the non-usage position, within the scope of the opening process when the protruding armrest cooperates with the sliding door in such a manner that the sliding door is displaced from the closed position into the intermediate position or open position.

15. The motor vehicle according to claim 1, wherein the protruding armrest is automatically moveable from the non-usage position into the usage position, within the scope of the closing process when the protruding armrest cooperates with the sliding door in such a manner that the sliding door is displaced from the open position into the intermediate position or closed position.

16. The motor vehicle according to claim 1, wherein in the non-usage position, the protruding armrest is adapted to at least partially lie in a receptacle on the inner side of the sliding door,
wherein in the non-usage position the protruding armrest is adapted to lie in the receptacle in such a manner that the protruding armrest recedes behind the inner side of the sliding door.

17. A motor vehicle, comprising:
a sliding door, having an inner side facing an interior of the motor vehicle, wherein the sliding door is configured to be displaced from a closed position in which an entry opening of the motor vehicle is closed by the sliding door;
a protruding armrest, disposed on the inner side, that is configured to automatically move from a non-usage position into a usage position during a closing process in which the sliding door is displaced from an open position via an intermediate position into the closed position; and a locking mechanism adapted for unlocking and locking the sliding door located in the closed position during an opening process or the closing process, wherein the protruding armrest is adapted to cooperate with the locking mechanism in such a manner that:

during unlocking of the sliding door, the protruding armrest is automatically movable from the usage position into the non-usage position; and during locking of the sliding door, the protruding armrest is automatically movable from the non-usage position into the usage position.

18. A motor vehicle according to claim 17, wherein the protruding armrest is further configured to automatically move from the usage position into the non-usage position during an opening process when the sliding door is being displaced from the closed position via the intermediate position into an open position, wherein the inner side of the sliding door is disposed opposite to an outer side of the adjoining vehicle wall when the sliding door is in the open position.

19. A motor vehicle according to claim 18, wherein during the non-usage position the protruding armrest is set back with respect to the usage position in a direction of the inner side of the sliding door.

20. A motor vehicle according to claim 18, wherein the sliding door is outwardly offset with respect to an adjoining vehicle wall during the opening process when the sliding door is at an intermediate position.

* * * * *

UNITED STATES PATENT AND TRADEMARK OFFICE
CERTIFICATE OF CORRECTION

| | | |
|---|---|---|
| PATENT NO. | : 8,403,398 B2 | Page 1 of 1 |
| APPLICATION NO. | : 12/541039 | |
| DATED | : March 26, 2013 | |
| INVENTOR(S) | : Harald Schulz | |

It is certified that error appears in the above-identified patent and that said Letters Patent is hereby corrected as shown below:

Title Page:

Item (75), "Nackenheim" should be changed to --Hocheim--.

Signed and Sealed this
Twenty-second Day of October, 2013

Teresa Stanek Rea
*Deputy Director of the United States Patent and Trademark Office*